Sept. 20, 1927.  
J. E. BOVE  
1,643,195  
DOUBLE TREAD PNEUMATIC TIRE  
Filed March 3, 1926
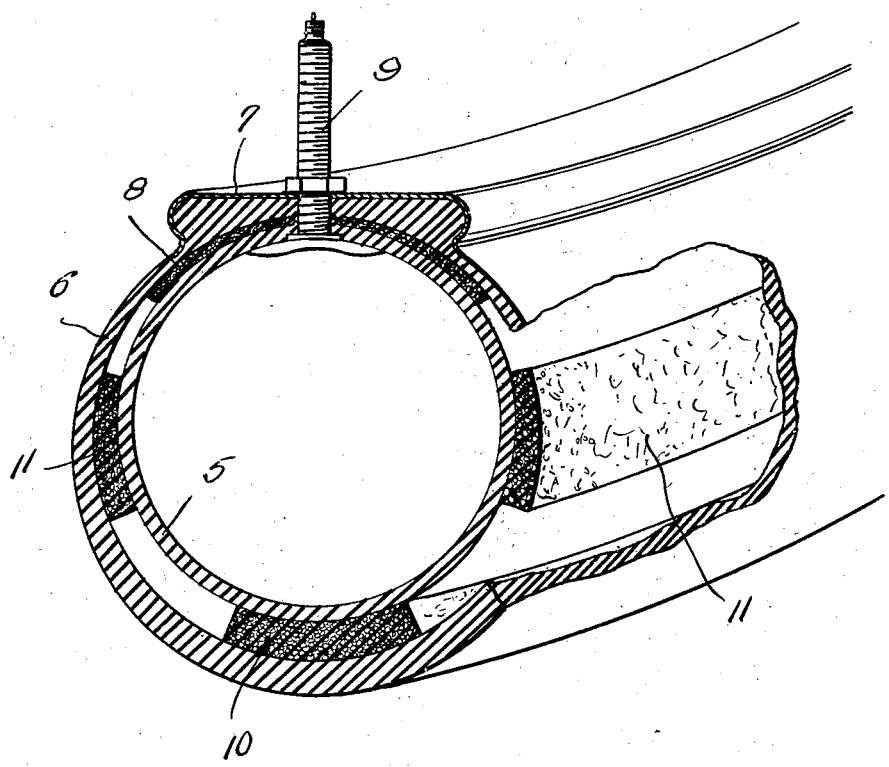
Inventor  
J. E. Bove,
By Clarence A O'Brien  
Attorney Patented Sept. 20, 1927.

1,643,195

UNITED STATES PATENT OFFICE.

JOSEPH E. BOVE, OF KEARNY, NEW JERSEY.

DOUBLE-TREAD PNEUMATIC TIRE.

Application filed March 3, 1926. Serial No. 91,972.

This invention relates to pneumatic tires and has for its primary object to provide a tire wherein the air receiving tube and protective shoe are embodied into a single unit, the same being arranged in spaced concentric relation in such a manner as to practically prevent the puncturing of the air chamber and avoid the pinching of the tube through reason of cuts, or bruises in the protecting shoe.

A further object is to provide a pneumatic tire of the aforementioned construction wherein the side walls of the shoe are integrally joined at the rim engaging surface thereof, and wherein the adjacent inner sides of the shoe and tube of the tire are so associated as to absolutely prevent the pinching of the tube by the shoe which is now a disadvantage of the pneumatic tires upon the market consisting of a separate tube and shoe.

A further object is to provide a tire construction of this character wherein air spaces are provided between the tube and shoe between the tread portion, rim portion, and side walls of the tire for greatly enhancing the resiliency of the tire when inflated.

A final salient object is to provide a tire of this character that may be manufactured and marketed as cheaply as a combined shoe and inner tube of which the pneumatic tires now upon the market usually exist.

Other objects will become apparent as the nature of the invention will be better understood, the same comprising the novel form of tire hereinafter more fully described, shown in the accompanying drawing and claimed.

In the drawing:—

The figure is a combined fragmentary perspective and cross section of a tire construction in accordance with the present invention, the side wall of the shoe being partly broken away for more clearly disclosing the interconnecting and spacing means between the shoe and air tube.

Now having particular reference to the drawing, 5 indicates an inner tube which is constructed of the same material, usually rubber, as the separate inner tubes now upon the market. In this instance, however, the thickness of the tube 5 is considerably greater than the thickness of the conventional inner tube in order that the same will withstand the proper air pressure without becoming unduly expanded.

Arranged slightly eccentrically around the tube 5 is a protecting shoe 6 of vulcanized rubber. This shoe is entirely closed and is formed at its inner side in such a manner as to provide a cylindrical surface 7 that is beaded at its opposite edges to facilitate the attachment of the tire upon a conventional form of wheel rim.

The tube 5 and shoe 6 are interconnected by a vulcanized rubber strip 8 at the rim sides thereof while leading from the tube at said rim side and passing through the center of the cylindrical portion 7 of the shoe 6 is a conventional form of inflating valve 9.

Arranged intermediate the tube 5 and shoe 6 at the tread portion thereof is a strip of porous rubber 10 that extends completely around the tire and to which said shoe and tube are joined by vulcanization.

Similarly disposed between the shoe and tube at the side walls thereof are strips of porous rubber 11 to which said tube and shoe are secured by vulcanization, these strips also extending entirely around the tire. The manner in which my improved puncture proof tire is constructed may be briefly stated as follows: After the inner tube 5 is formed, the strips 8, 10 and 11 are vulcanized to an inner tube, and as is clearly shown in the drawing, these strips gradually increase in thickness toward the center of the tread portion of the inner tube. The tube is then inflated to the desired size in order to accommodate the tire shoe 6, and the tire shoe 6 is built around the inner tube and the strips vulcanized thereon, and this outer shoe is vulcanized to the strip so that a unitary structure is provided.

The strips 10 and 11—11 obviously maintain the tube and shoe in spaced positions and prevent the rubbing of the tube upon the interior of the shoe and also provide air spaces between the shoe and tube at four spaced points as clearly shown in the drawing, these air spaces permitting the shoe to be depressed at these points without in any manner affecting the tube 5 and also for practically preventing the puncturing of the tube as well as the shoe at these points.

By reason of the strips of porous rubber between the shoe and tube, said tube will be practically punctureproof at these points, but should a nail or particles of glass reach the tube at these points, the holes or openings would be immediately sealed by the action of the porous rubber, the nature of which is to tend to close any opening in the rubber by its inherent qualities.

It will thus be seen that I have provided a highly novel, simple, but yet efficient form of pneumatic tire that is well adapted for all the purposes heretofore designated, but even though I have herein shown and described the most practical embodiment of the invention with which I am at this time familiar, it is nevertheless to be understood that departures may be had without affecting the spirit and scope of the appended claim.

Having thus described the invention, what I claim as new and desire to secure by Letters Patent is:—

A penumatic tire of the class described comprising an inner tube of relatively great thickness, an outer shoe arranged eccentrically around the tire for providing a space therebetween at the sides and tread portions thereof, said outer shoe being closed and formed at its inner side with a cylindrical rim engaging surface, said cylindrical surface being beaded at its opposite edges to facilitate the attachment of the tire upon a conventional wheel rim, circumferentially extending strips of rubber arranged between the inner tube and the shoe at the tread and side walls thereof, for maintaining the same in spaced relation, and an additional relatively wide strip of rubber extending circumferentially between the rim side of the outer shoe and the adjacent portion of the inner tube, said strip being formed of porous rubber and vulcanized to the outer and inner walls of the inner tube and outer shoe respectively, the strips gradually increasing in thickness toward the center of the tread portion of the tire, and further providing circumferentially extending air pockets.

In testimony whereof I affix my signature.

JOSEPH E. BOVE.